(12) United States Patent
Nimmagadda et al.

(10) Patent No.: US 12,086,290 B2
(45) Date of Patent: Sep. 10, 2024

(54) INTEGRITY VERIFICATION OF PRE-COMPILED ARTIFICIAL INTELLIGENCE MODEL BLOBS USING MODEL SIGNATURES

(71) Applicant: Intel Corporation, Santa Clara, CA (US)

(72) Inventors: Yamini Nimmagadda, Portland, OR (US); Akhila Vidiyala, Beaverton, OR (US); Suryaprakash Shanmugam, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 17/406,755

(22) Filed: Aug. 19, 2021

(65) Prior Publication Data
US 2021/0383026 A1 Dec. 9, 2021

(51) Int. Cl.
G06F 21/64 (2013.01)
G06F 8/41 (2018.01)
G06N 5/04 (2023.01)
H04L 9/32 (2006.01)

(52) U.S. Cl.
CPC ............. *G06F 21/64* (2013.01); *G06F 8/41* (2013.01); *G06N 5/04* (2013.01); *H04L 9/3236* (2013.01); *H04L 9/3247* (2013.01)

(58) Field of Classification Search
CPC ......... G06F 21/64; G06F 8/41; H04L 9/3236; H04L 9/3247; H04L 9/50; H04L 2209/60; H04L 9/3239; G06N 5/04; G06N 3/10
See application file for complete search history.

(56) References Cited

U.S. PATENT DOCUMENTS

| 2018/0293517 A1* | 10/2018 | Browne | G06F 8/38 |
| 2020/0226453 A1* | 7/2020 | Luk | G06N 3/04 |
| 2022/0147792 A1* | 5/2022 | Jiao | G06N 3/04 |

* cited by examiner

*Primary Examiner* — Wasika Nipa
*Assistant Examiner* — Andrew Suh
(74) *Attorney, Agent, or Firm* — Jordan IP Law, LLC

(57) ABSTRACT

Systems, apparatuses and methods include technology that generates a signature based on one or more characteristics of an artificial intelligence (AI) model. The AI model is in a source code. The technology generates a compiled blob based on the AI model and embeds an identifier based on the signature into a metadata field of the compiled blob.

25 Claims, 10 Drawing Sheets

INTEGRITY VERIFICATION OF PRE-COMPILED ARTIFICIAL INTELLIGENCE MODEL BLOBS USING MODEL SIGNATURES

CROSS-REFERENCE TO RELATED APPLICATION

The present application claims the benefit of priority to Indian Patent Application No. 202141026229, filed on Jun. 12, 2021.

TECHNICAL FIELD

Embodiments generally relate to processing architectures that execute artificial intelligence (AI) processing. More particularly, embodiments relate to storing identification data in a compiled AI blob to verify that the integrity of the compiled AI blob.

BACKGROUND

With the proliferation of AI use-cases on edge, usage on edge clusters with heterogeneous compute capacity and varying resources is expanding in scope and size. Some edge accelerators, such as a vision processing unit (VPU), employ resource-intensive compilers that require substantial power to execute long latency graph modifications and partitioning techniques to compile model graphs. Due to the high compile time and resources in such instances, AI models may be compiled on machines with larger compute and memory resources than the edge accelerators to generate machine compatible AI model blobs (e.g., a low-level programming language optimized for a specific hardware). The AI model blobs are then transferred to the edge devices for execution. The AI model blobs may further be reused across edge clusters to avoid redundantly compiling the same AI models.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

AI model blobs are often stored for reuse with new inference requests and processes. In some examples, there is a possibility that blob file names of the AI model blobs may be modified, or the AI model blobs may be replaced with malicious blobs (e.g., harmful and/or inaccurate code) that are intended to execute malicious code. Thus, some embodiments provide a verification of the integrity of the AI model blobs in a light-weight manner to minimize impacts on performance and resource utilization, while also enabling an enhanced and secure processing environment for pre-compiled blob execution.

For example, embodiments as described herein generate an identifier (which is referred to as a first identifier for clarity in the example below) based on characteristics of an AI model in a source code (e.g., not yet compiled). The first identifier may be consistently generated based on the characteristics (e.g., same identifier may be repeatedly and reliably generated based on the same characteristics). The AI model may be compiled to generate an AI blob (which may be referred to as an AI model blob). The AI blob may be mapped to the AI model for future reference. The first identifier may be stored in a field of the AI blob. The first identifier may be verified prior to execution to authenticate the AI blob.

For example, suppose that the AI model is again selected for deployment (e.g., execution) after the AI blob is generated. The AI blob may be identified based on the mapping of the AI blob to AI model. As noted, it may be preferable to bypass recompiling the AI model to reduce latency and conserve computing resources. Thus, it may be preferable to execute the AI blob for inference processing to avoid compiling the AI model again. To verify the authenticity of the AI blob prior to execution, some embodiments generate a second identifier from the AI model, and compare the second identifier of the AI model against the first identifier stored in the AI blob. If the second identifier of the AI model matches the first identifier of the AI blob (e.g., the first identifier is identical to the second identifier), then the AI blob is verified and may be utilized for execution. Otherwise, the AI blob may be discarded, and the AI model may be compiled again. Notably the above process is lightweight (e.g., less hardware and software modifications if at all, etc.) as compared to other approaches (e.g., encryption and decryption schemes, key management schemes that rely on key distribution to all processes that utilize an AI blob, etc.) for blob verification and security, and is repeatable across a large scale of heterogeneous devices. Moreover, the above process verifies the security of the AI blob and avoids recompiling in a manner that reduces processing power and latency as opposed to recompiling the AI model.

Figure 1:
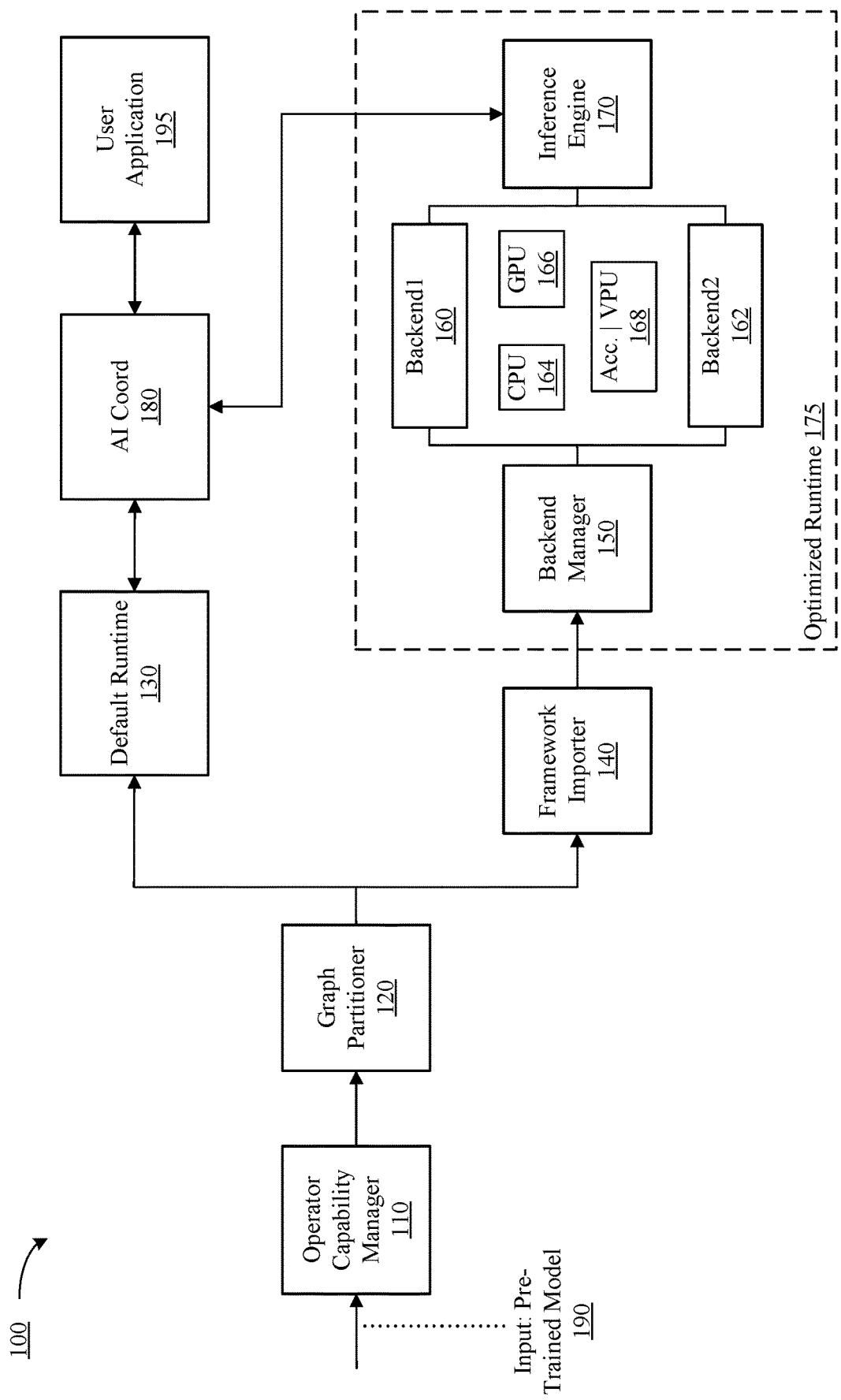
FIG. 1 is a block diagram of an example of a block an AI framework integration system according to an embodiment.

Turning now to FIG. 1 provides a block diagram illustrating an example of an AI framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a CPU 164, a GPU 166, and a hardware accelerator such as a VPU (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 may be developed using an AI framework from a variety of sources, including, for example, TensorFlow, ONNX Runtime, PyTorch, etc. The pre-trained model 190 typically includes information and data regarding the model architecture (i.e., graph), including nodes, operators, weights and biases. Each node in a model graph represents an operation (e.g. mathematical, logical operator etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types (e.g., precision data types), and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, e.g., the backend1 160 or the backend2 162. In some embodiments, the backend1 160 represents a basic backend that is optimized for a particular group of hardware units. For example, where the optimized runtime 175 utilizes the Open Visual Inference and Neural network Optimization (OpenVINO) runtime technology, the backend1 160 can be the OpenVINO backend. In some embodiments, the backend2 162 can be a backend such as VAD-M, which is optimized for machine vision tasks using a VPU such as the Intel® Myriad X VPU. The selected backend compiles (via a compiler) supported subgraphs into executable code, and performs optimization. The backend manager also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175.

Some or all components in the system 100 may be implemented using one or more of a CPU, a GPU, an AI accelerator, a FPGA accelerator, an ASIC, and/or via a processor with software, or in a combination of a processor with software and an FPGA or ASIC. More particularly, components of the system 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, ASIC, complementary metal oxide semiconductor (CMOS) or transistor-transistor logic (TTL) technology, or any combination thereof.

For example, computer program code to carry out operations by the system 100 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/ or other structural components that are native to hardware (e.g., host processor, central processing unit/CPU, microcontroller, etc.).

Figure 2:
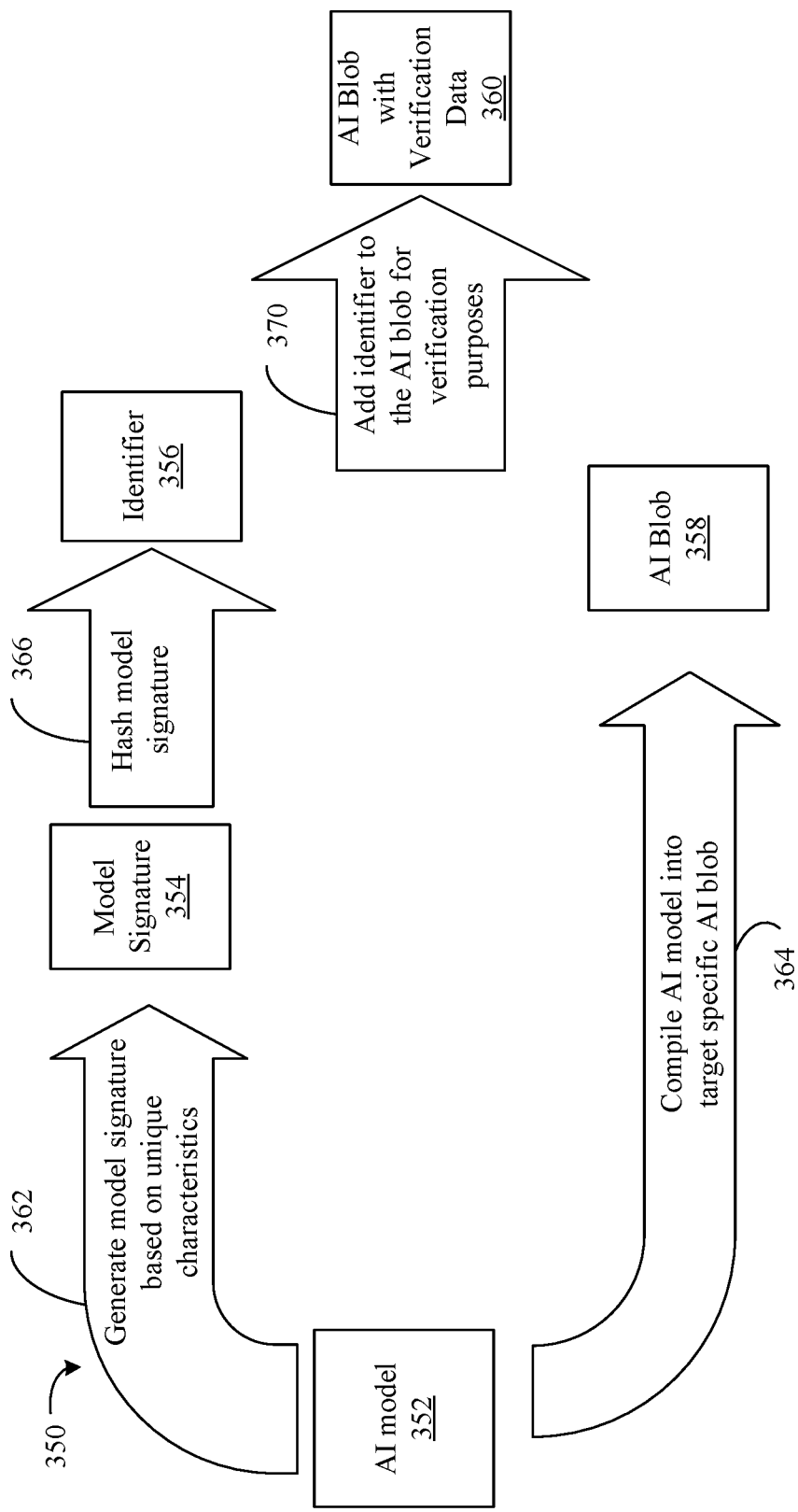
FIG. 2 is a diagram of an example of a process to generate a verifiable blob according to an embodiment.

FIG. 2 shows a process 350 to generate a verifiable blob that is able to be reused in a secure and efficient manner. In detail, an AI model 352 may be provided. The AI model 352 may be a graph model of a neural network. The AI model 352 may be a graph model that corresponds to a source code (e.g., a high level code written in a human-readable programming language such as C, C++, Java, etc. that is compatible with many different types of hardware devices). The process 350 generates a model signature 354 based on unique characteristics 362 of the AI model 352. For example, the AI model 352 may be in framework format (e.g., protocol buffer format, checkpoint format, Hierarchical Data Format, Open Neural Network Exchange, etc.) and is used to create a graph proto. The graph proto may be a topology of the AI model 352 along with attributes and weights. For example, the graph proto may define the computational logic of a model and is comprised of a parameterized list of nodes that form a directed acyclic graph based on their inputs and outputs. Layers in the AI model 352 (e.g., layers of the graph proto) may be sorted topologically.

The unique characteristics may include one or more of layer types of the AI model 352, attribute names of the AI model 352, values (e.g., constants) of the AI model 352 or weights of the AI model 352. Layers are nodes in the graph of the AI model 352. Some examples of layers (or nodes) include convolution, relu, maxpool, etc. The layers each include attributes specific to each node/layer. For example, convolution includes strides, kernel size, weights, biases and so on which may be used as values and weights in the above.

In some examples, the model signature 354 is a concatenated string comprising a concatenation of the characteristics (e.g., layer types, the attribute names, the values and the weights). In some examples, the process 350 includes only utilizes a subset of the weights (e.g., a first weight and a last weight) of channels of operators of the AI model 352. For example, the layers may each comprise an operator. In some examples, the operators may include numerous weights. To reduce a length (or size) of the concatenated string, embodiments include the first and last weights of each channel of the operator in the concatenated string and bypass the other weights of each channel for inclusion in the concatenated string.

For example, some operators (e.g., Convolution, Gemm, Fully Connected, MatMul, etc.) may have a significant amount of weights. Thus, some examples determine whether each of the operators in the AI model 352 correspond to an operator that has a significant amount of weights, and if so, only utilize the first and last weight elements in each channel of the operator to reduce the length of the string. A channel may characterize a particular aspect of an input data stream. For example, if the input data stream is an image, the number of channels may be three (e.g., red channel, green channel, and blue channel) to characterize an amount of red in the image, an amount of green in the image and an amount of blue in the image. The number of channels between operators may vary significantly, and thus only some operators are reduced in length (or size) as mentioned above. Some operators may include all weights in the concatenated string. Therefore, some embodiments compare each operator of the operators in the AI model 352 to a list of operators that are identified as having large weights. If the operator is in the list, only a subset of weights of the operator may be included in the concatenated string of the model signature 354.

The process 350 includes hashing the model signature 354, 366 to generate an identifier 356. For example, the process 350 may employ a hash function (e.g., Secure Hash Algorithm 2) to generate a unique hashed value based on the model signature 354. In doing so, the model signature 354 may be reliably and repeatably formed into a same unique value. The unique hashed value is set as the identifier 356.

Concurrently with the above or thereafter, the AI model 352 may be compiled. That is, the process 350 includes compiling the AI model 352 into a target specific (e.g., hardware device such as a hardware AI accelerator) AI blob 358. For example, the process 350 may compile the AI model 352 using several optimization and scheduling passes to be compatible with a hardware AI accelerator. The process 350 may therefore compile the AI model 352 into an AI blob 358 that is a low-level programming language specific to and compatible with only one type of hardware device.

The process 350 then adds the identifier 356 to the AI blob 358 for verification purposes 370. For example, the identifier 356 (e.g., an SHA value) may be embedded into a custom read-only metadata field of the AI blob 358 created for the identifier 356.

As will be explained further below, during a deploy stage, the AI blob 358 integrity is verified. For example, suppose that the AI model 352 is determined to be executed at a later time for inference. The AI blob 358 is a compiled version of the AI model 352 and may be deployed to reduce latency and processing power rather than compiling the AI model 352 again. Prior to deploying the AI blob 358, the identifier 356 is read from the AI blob 358. A hash value of characteristics (e.g., a concatenated string) of the AI model 352 may be calculated again based on the same hash function described above. If the hash value matches the identifier 356, the AI blob 358 may be authenticated and deployed. That is, the AI blob 358 is then loaded onto an accelerator and inference is executed. Otherwise, if the hash value does not match the identifier 356 stored in the AI blob 358, the AI blob 358 may be discarded and the AI model 352 may be compiled again to enhance security (e.g., lockout unverified and potentially malicious code from execution).

Embodiments described herein generate unique model signatures from hash functions of the layer types, attributes, and weights of the model. The model is then compiled to generate accelerator-compatible blob. This signature is embedded into a read-only metadata field of the blob. The above may occur at a first node. When the blob is re-used at a second node, the model signature is computed from the original model and compared against the signature embedded into the blob metadata to verify the integrity of the blob.

Using the above implementation, embodiments may verify that the blob requested is the blob deployed without tampering. Some embodiments further may ensure that the users do not have to wait for lengthy periods of time (e.g., several hours) to regenerate the blob for every use while providing a trustworthy method for deploying solutions in production at scale.

Embodiments provide a method to verify the blob integrity while reusing pre-compiled AI model blobs. For running inference on accelerators with specialized architecture, the AI model 352 may be compiled and scheduled in an efficient manner that intelligently utilizes the different compute and memory units present in the accelerator. For example, some VPUs have 20 Deep Learning Processor Units (DPUs) for executing hardware accelerated operators, 16 Shaves for running software layers, Connection Matrix memory for faster access of data and Double Data Rate Synchronous Dynamic Random-Access Memory for storing the entire model. Optimizing the AI model 352 to execute on such specific hardware may incur significant latency and performance penalties. Thus, some embodiments securely reuse the AI blob 358 to bypass compilation and reuse the AI blob 358 across the VPUs.

Figure 3:
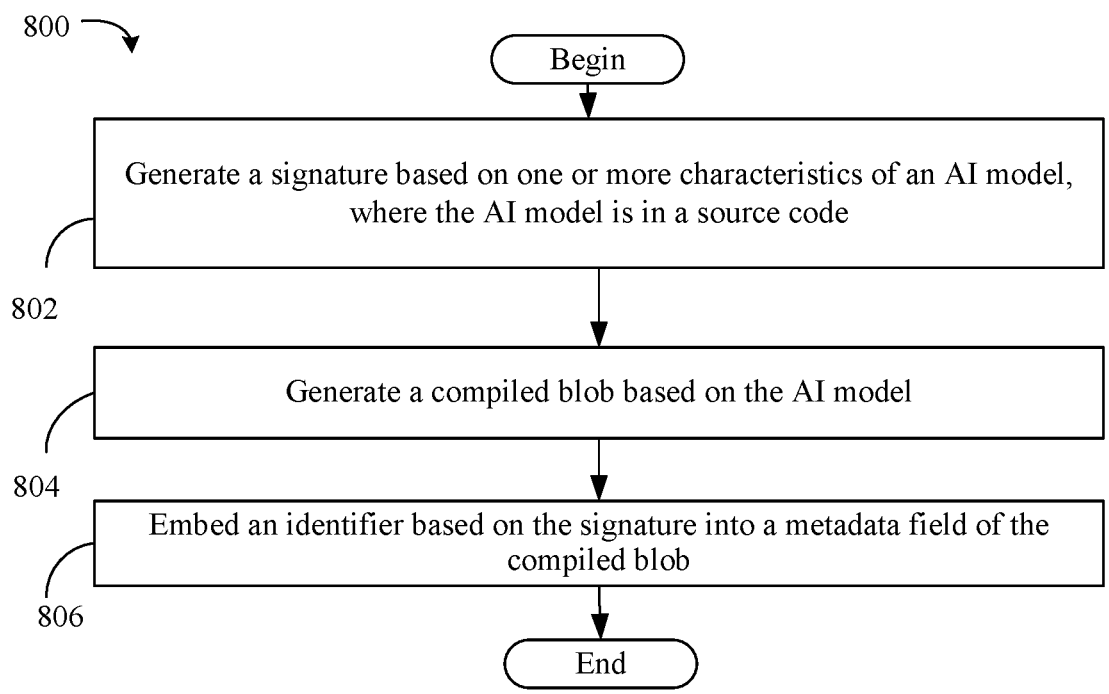
FIG. 3 is a flowchart of an example of a method of AI blob generation, verification and deployment according to an embodiment.

FIG. 3 shows a method 800 of AI blob generation, verification and deployment. The method 800 may generally be implemented with the embodiments described herein, for example, the system 100 (FIG. 1) and/or the process 350 (FIG. 2), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 generates a signature based on one or more characteristics of an AI model, where the AI model is in a high-level code (e.g., designed to be read by humans and compatible with numerous hardware architectures). Illustrated processing block 804 generates a compiled blob based on the AI model. Illustrated processing block 806 embeds an identifier based on the signature into a metadata field of the compiled blob.

In some embodiments, the one or more characteristics includes one or more of layer types of the AI model, attribute names of the AI model, values of the AI model or weights of the AI model. In such embodiments, the method 800 further includes concatenating the layer types, the attribute names, the values and the weights to generate a concatenated string. The method 800 further includes generating the identifier based on the concatenated string. In such embodiments, the method 800 includes determining that one or more weights of an operator of the AI model are bypassed, and concatenating a first weight associated with the operator and a last weight associated with the operator to generate the concatenated string.

In some embodiments, the method 800 includes retrieving the compiled blob, conducting a verification of the identifier embedded in the compiled blob and determining whether to execute the compiled blob based on the verification. In some embodiments, the method 800 includes hashing the signature to generate a hashed signature and setting the hashed signature as the identifier.

Figure 4:
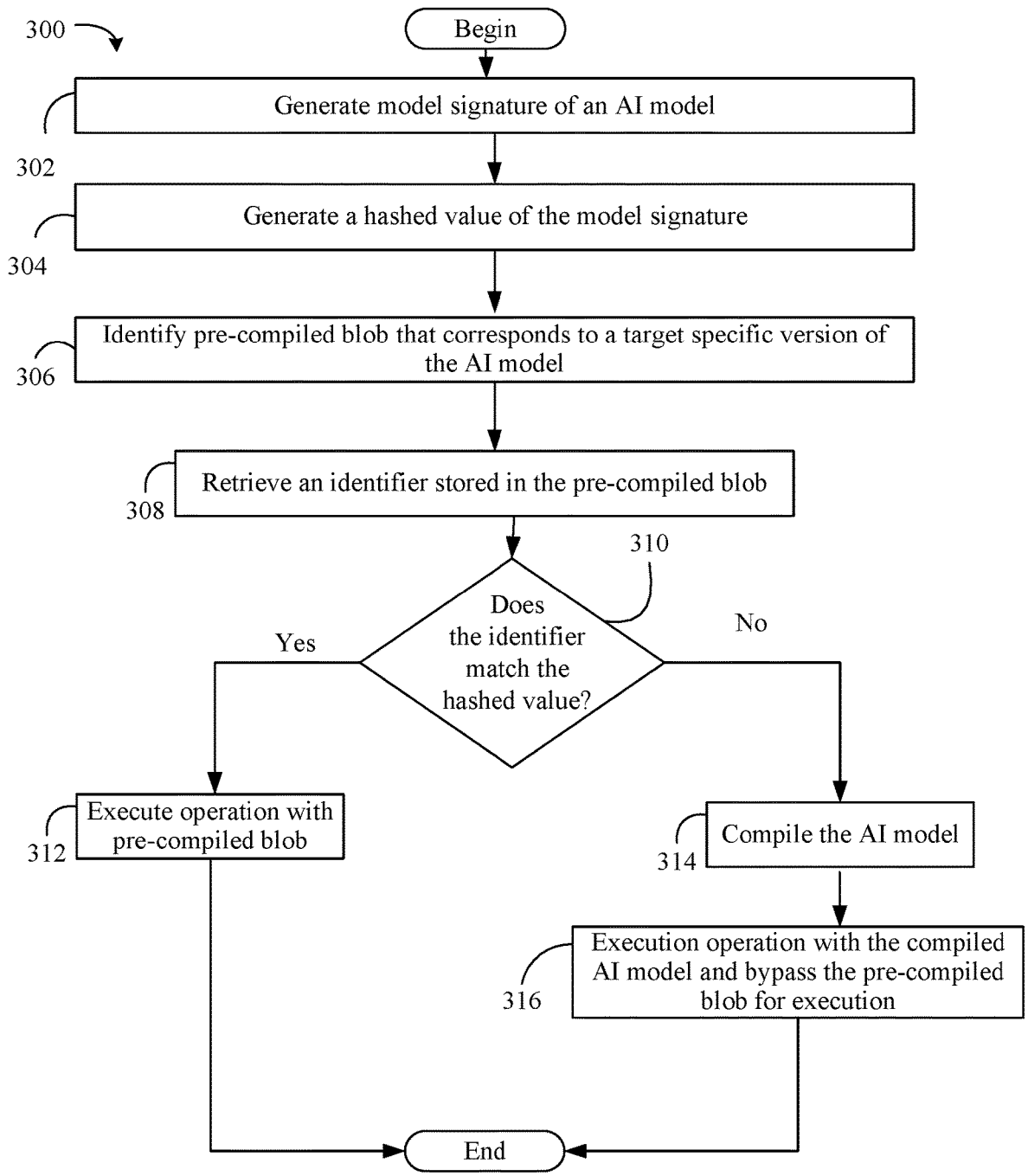
FIG. 4 is a flowchart of an example of a method of a pre-compiled blob verification method according to an embodiment.

FIG. 4 shows a pre-compiled blob verification method 300. The method 300 may generally be implemented with the embodiments described herein, for example, the system 100 (FIG. 1), the process 350 (FIG. 2) and/or method 800 (FIG. 3) already discussed. The method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 302 generates a model signature of an AI model (e.g., an AI model graph that is to be executed during inference). Illustrated processing block 304 generates a hashed value of the model signature. In some embodiments, illustrated processing block 304 hashes the model signature with a hash function. Illustrated processing block 306 identifies a pre-compiled blob (e.g., an AI blob) that corresponds to a target specific version of the AI model. The pre-compiled blob may have been generated during a previous execution of the AI model. Illustrated processing block 308 retrieves an identifier stored in the pre-compiled blob. Illustrated processing block 310 determines if the identifier matches the hashed value. If so, illustrated processing block 312 executes operation (e.g., inference) with the pre-compiled blob.

If the identifier does not match the hashed value, illustrated processing block 314 compiles the AI model. Illustrated processing block 316 executes operation with the compiled AI model and bypasses the pre-compiled blob for execution.

In some examples, the pre-compiled blob may be stored in the file system of an edge device or deployed from external storage buckets. There may be different scenarios at an edge where the pre-compiled blob is used for inference: 1) loading the pre-compiled blob for the first time and running inference continuously on an input stream, 2) swapping more than one pre-compiled blob based on the inference requests, 3) deploying the same pre-compiled blob on multiple edge devices. In all these scenarios, if the pre-compiled blob is only verified based on the file name or model path, there is a possibility that the pre-compiled blob is replaced with another blob, or the pre-compiled blob is not found because it is renamed accidentally. Thus, method 300 verifies the pre-compiled blob integrity to determine if the pre-compiled blob corresponds to the AI model needed for inference to alleviate such concerns.

Figure 5:
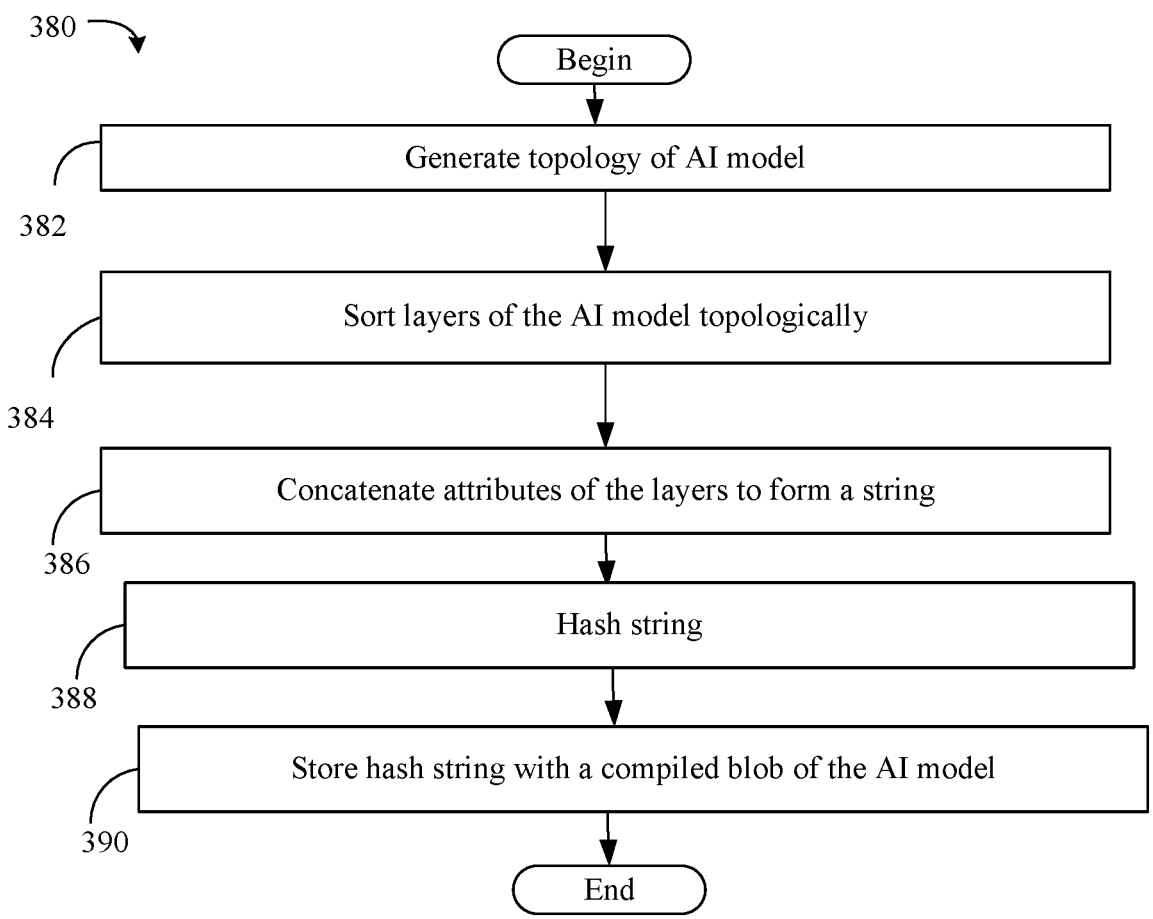
FIG. 5 is a flowchart of an example of a method of a blob identifier generation method according to an embodiment.

FIG. 5 shows a blob identifier generation method 380. The method 380 may generally be implemented with the embodiments described herein, for example, the system 100 (FIG. 1), the process 350 (FIG. 2), method 800 (FIG. 3) and/or method 300 (FIG. 4) already discussed. The method 380 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 382 generates a topology of an AI model. Illustrated processing block 384 sorts layers of the AI model topologically. Illustrated processing block 386 concatenates attributes (e.g., characteristics) of the layers to form a string. Illustrated processing block 388 hashes the string. Illustrated processing block 390 stores the hash string with a compiled blob of the AI model.

Figure 6:
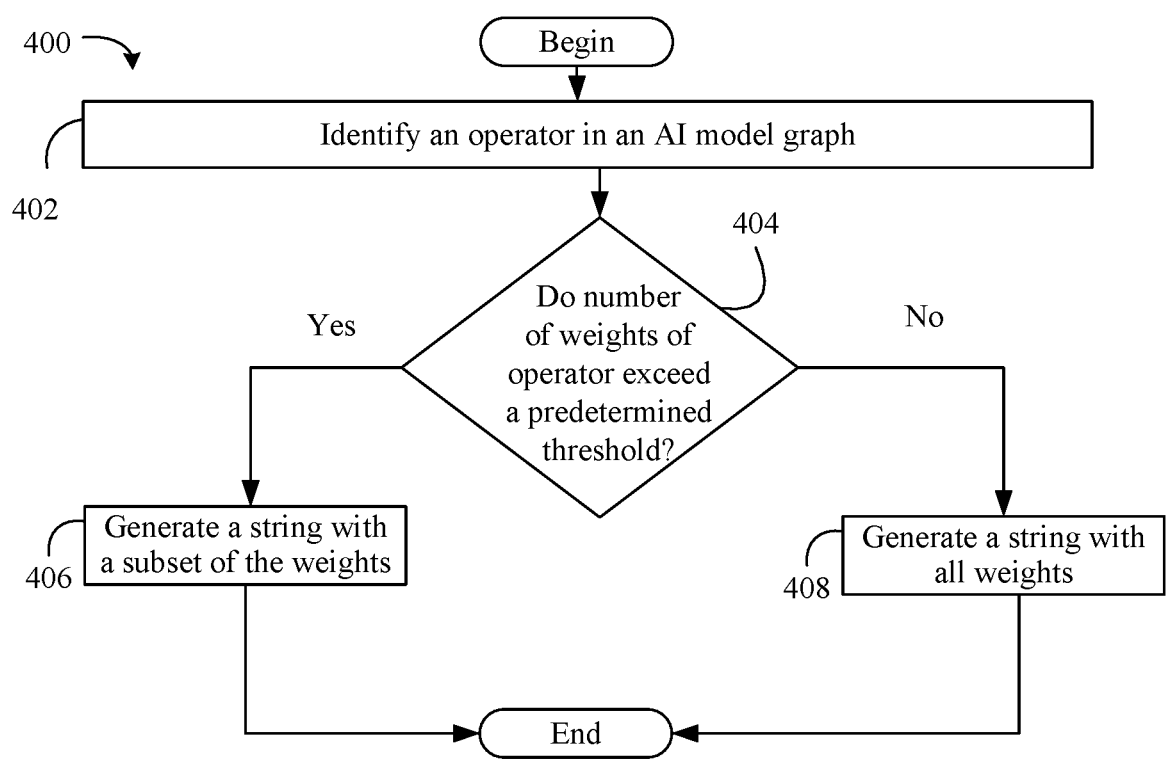
FIG. 6 is a flowchart of an example of a method of selection of weights from an AI model graph method according to an embodiment.

FIG. 6 shows a method 400 to select weights from an AI model graph for string generation. The method 400 may generally be implemented with the embodiments described herein, for example, the system 100 (FIG. 1), the process 350 (FIG. 2), method 800 (FIG. 3) and/or method 300 (FIG. 4) and/or method 380 (FIG. 5) already discussed. The method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 identifies an operator in an AI model graph. Illustrated processing block 404 determines if a number of weights of the operator exceeds a predetermined threshold. If so, illustrated processing block 406 generates a string with a subset of the weights (e.g., concatenates the subset of weights along with other characteristics of the AI model graph). Otherwise, illustrated processing block 408 generates a string with all weights (e.g., concatenates the weights along with other characteristics of the AI model graph). In some embodiments, the method 400 hashes the string.

Figure 7:
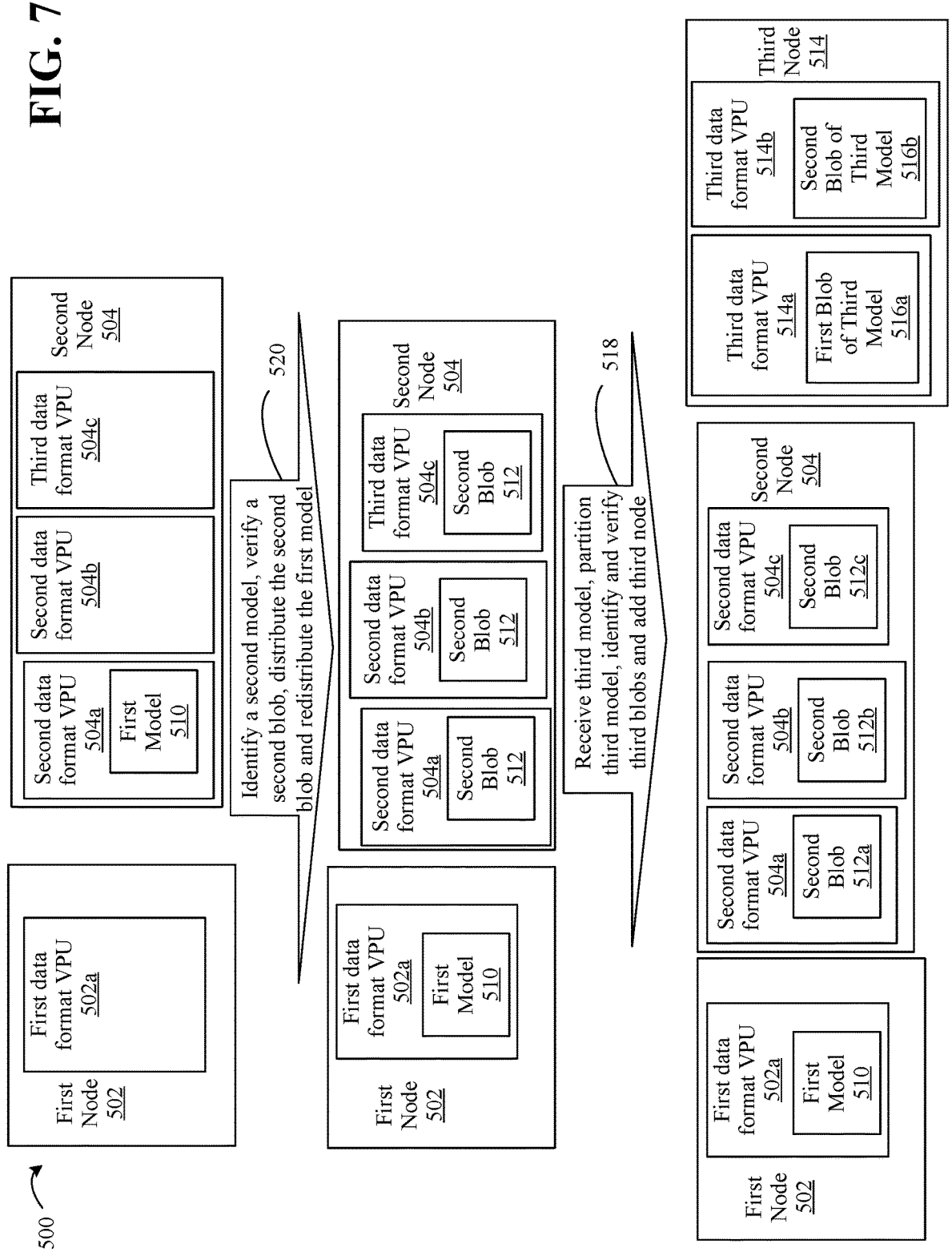
FIG. 7 is a process of an example of distributing and assigning workloads according to an embodiment.

FIG. 7 shows a distribution process 500 to distribute and assign workloads among a plurality of nodes. The process 500 may generally be implemented with the embodiments described herein, for example, for example, the system 100 (FIG. 1), the process 350 (FIG. 2), method 800 (FIG. 3) and/or method 300 (FIG. 4), method 380 (FIG. 5) and/or method 400 (FIG. 6) already discussed. The process 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process 500 includes a first node 502 that includes a first data format VPU 502a (e.g., an FP16 format). A second node 504 may represent a more advanced architecture than the first node 502 and includes second data format (e.g., INT8) VPUs 504a, 504b, 504c. As illustrated, a first model 510 (a compiled AI model) is being executed on the second data format VPU 504a. The process 500 includes identifying a second model (e.g., an AI model), verifying a second blob 512, distributing the second blob 512 and redistributing the first model 510, 520. For example, the process 500 may determine that the second model is to be executed for inference processing. The process 500 may then identify that the second blob 512 is a low-level language representation of the second model (e.g., a source code and/or high-level code), and is compatible with the second data format VPUs 504a, 504b, 504c. Thus, to bypass lengthy compilation processes, the process 500 verifies the second blob 512 prior to execution. For example, the process 500 may verify that a first identifier of the second blob 512 matches a second identifier generated from the second model, and therefore that the second blob 512 is authentic. Thus, the second blob 512 is verified.

In this example, there are three parallel executions of the second blob 512 for inference processing and may require the advanced architecture of the second node 504 to operate. In contrast, the first model 510 may operate on either the first node 502 or the second node 504. Thus, the first model 510 is pushed to the first node 502 to execute on the first data format VPU 502a. In some examples, a corresponding version of the first model 510 that is optimized for the first data format VPU 502a is identified and provided to the first data format VPU 502a. Copies of the second blob 512 are distributed to the second data format VPUs 504a, 504b, 504c respectively.

Thereafter, process 500 receives a third model (e.g., an AI model), partitions the third model, identifies and verifies third blobs and adds a third node 514, 518. For example, the third model may have memory and/or compute requirements that exceed the memory and/or compute individually supported by the first data format VPU 502a, second data format VPUs 504a, 504b, 504c and third data format VPUs 514a, 514b. Thus, the third model is partitioned into a first portion (e.g., a subgraph) of the third model and a second portion (e.g., a subgraph) of the third model. The process 500 may determine that the first portion of the third model corresponds to a first blob of the third model 516a, and the second portion of the third model corresponds to a second blob of the third model 516b. The first blob of the third model 516a and the second blob of the third model 516b may be verified for integrity as discussed above. The first blob of the third model 516a executes on the third node 514 in the third data format VPU 514a, and the second blob of the third model 516b executes on the third node 514 in the third data format VPU 514b.

Figure 8:
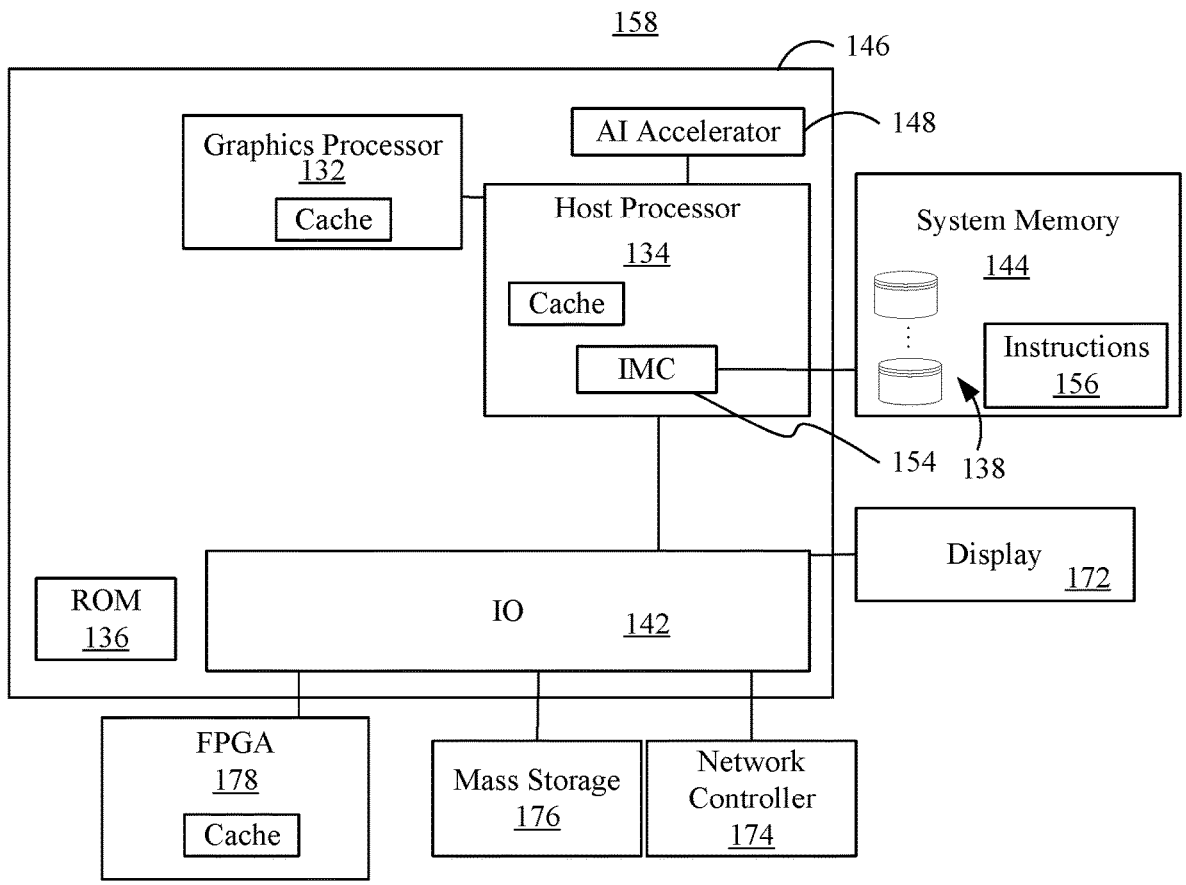
FIG. 8 is a block diagram of an example of a graph and input stream partitioning computing system according to an embodiment.

Turning now to FIG. 8, a security and performance enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the computing system 158 includes a host processor 134 (e.g., CPU) having an integrated memory controller (IMC) 154 that is coupled to a system memory 144.

The illustrated computing system 158 also includes an input output (IO) module 142 implemented together with the host processor 134, a graphics processor 132 (e.g., GPU), ROM 136, and AI accelerator 148 on a semiconductor die 146 as a system on chip (SoC). The illustrated IO module 142 communicates with, for example, a display 172 (e.g., touch screen, liquid crystal display/LCD, light emitting diode/LED display), a network controller 174 (e.g., wired and/or wireless), FPGA 178 and mass storage 176 (e.g., hard disk drive/HDD, optical disk, solid state drive/SSD, flash memory). Furthermore, the SoC 146 may further include processors (not shown) and/or the AI accelerator 148 dedicated to artificial intelligence (AI) and/or neural network (NN) processing. For example, the system SoC 146 may include vision processing units (VPUs,) and/or other AI/NN-specific processors such as AI accelerator 148, etc. In some embodiments, any aspect of the embodiments described herein may be implemented in the processors and/or accelerators dedicated to AI and/or NN processing such as AI accelerator 148, the graphics processor 132 and/or the host processor 134.

The graphics processor 132 and/or the host processor 134 may execute instructions 156 retrieved from the system memory 144 (e.g., a dynamic random-access memory) and/or the mass storage 176 to implement aspects as described herein. For example, the graphics processor 132 and/or the host processor 134 may identify an AI model (e.g., a high-level code) for execution. The computing system 158 may generate a signature based on one or more characteristics of the AI model, and generate a compiled blob based on the AI model. The computing system 158 may then embed an identifier based on the signature into a metadata field of the compiled blob. The compiled blob (which includes the identifier) may be stored as one of compiled blobs 138. The compiled blob may be distributed to edge nodes through the network controller 174 for inference processing. The compiled blob may be verified for integrity prior to execution based on the identifier (e.g., whether the identifier matches an expected identifier for the AI model).

When the instructions 156 are executed, the computing system 158 may implement one or more aspects of the embodiments described herein. For example, the computing system 158 may implement one or more aspects of system 100 (FIG. 1), the process 350 (FIG. 2), method 800 (FIG. 3) and/or method 300 (FIG. 4), method 380 (FIG. 5), method 400 (FIG. 6) and/or process 500 (FIG. 7) already discussed. The illustrated computing system 158 is therefore considered to be security-enhanced at least to the extent that it enables the computing system 158 to avoid and discard unverifiable code, and take advantage of low latency blob retrieval to execute an AI blob to reduce processing power and overhead.

Figure 9:
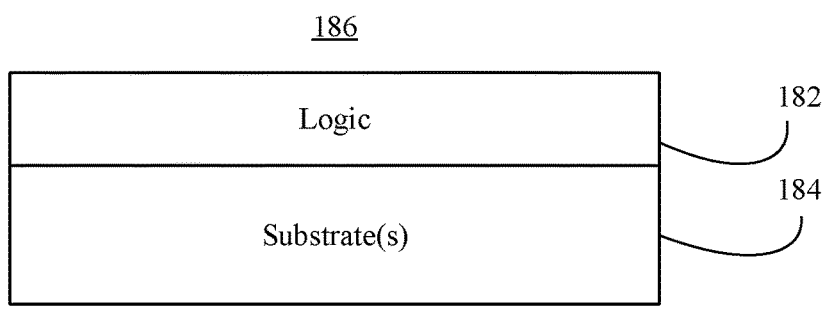
FIG. 9 is an illustration of an example of a semiconductor apparatus according to an embodiment.

FIG. 9 shows a semiconductor apparatus 186 (e.g., chip, die, package). The illustrated apparatus 186 includes one or more substrates 184 (e.g., silicon, sapphire, gallium arsenide) and logic 182 (e.g., transistor array and other integrated circuit/IC components) coupled to the substrate(s) 184. In an embodiment, the apparatus 186 is operated in an application development stage and the logic 182 performs one or more aspects of the embodiments described herein, for example, system 100 (FIG. 1), the process 350 (FIG. 2), method 800 (FIG. 3) and/or method 300 (FIG. 4), method 380 (FIG. 5), method 400 (FIG. 6) and/or process 500 (FIG. 7) already discussed. Thus, the logic 182 may analyze generate a signature based on one or more characteristics of an artificial intelligence (AI) model, where the AI model is in a high-level code. The logic 182 further generates a compiled blob based on the AI model and embeds an identifier based on the signature into a metadata field of the compiled blob. Furthermore, the logic 182 may further include processors (not shown) and/or AI accelerator dedicated to artificial intelligence AI and/or NN processing. For example, the system logic 182 may include VPUs, and/or other AI/NN-specific processors such as AI accelerators, etc. In some embodiments, any aspect of the embodiments described herein may be implemented in the processors and/or accelerators dedicated to AI and/or NN processing such as AI accelerators.

The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 10:
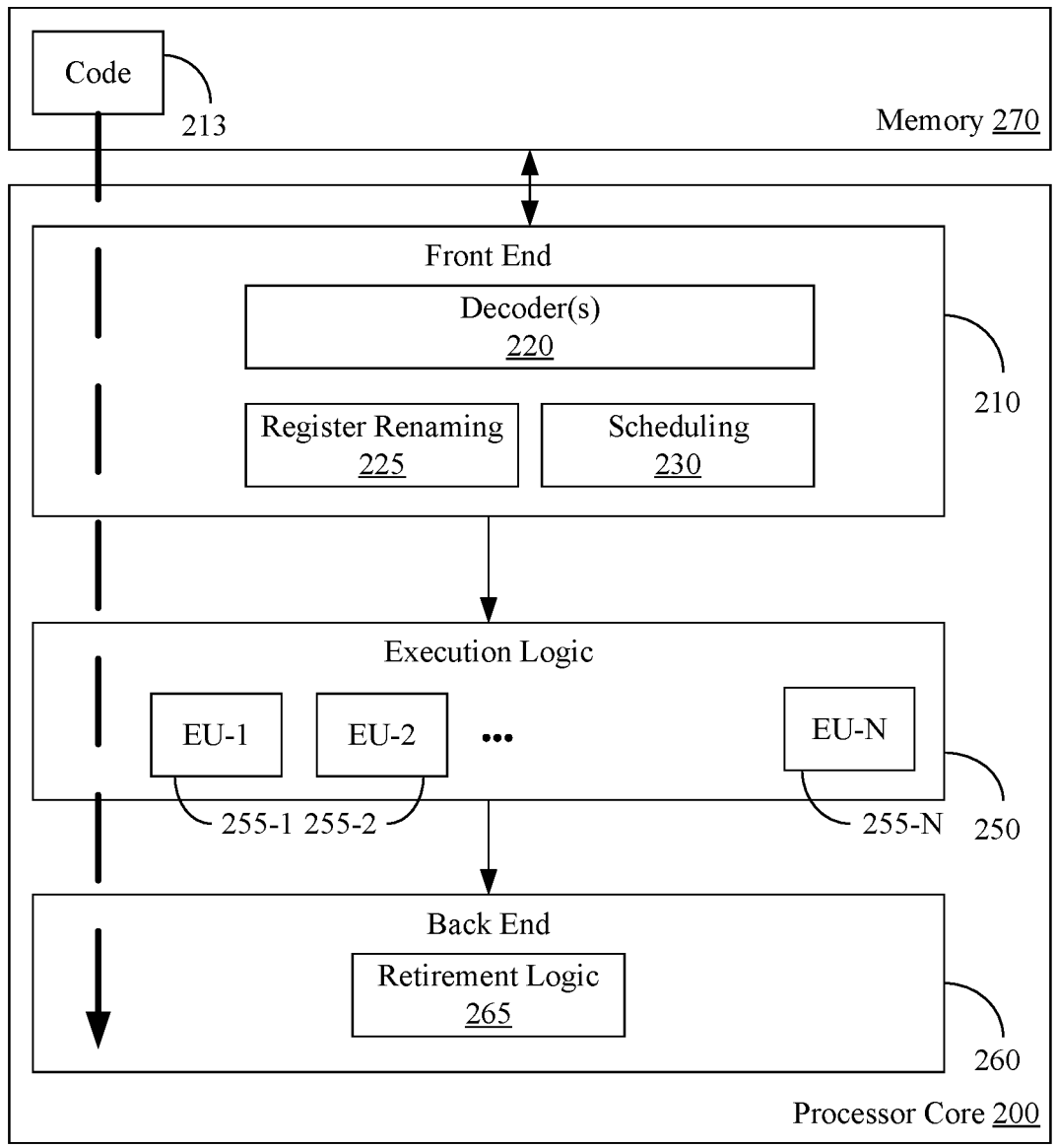
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, system 100 (FIG. 1), the process 350 (FIG. 2), method 800 (FIG. 3) and/or method 300 (FIG. 4), method 380 (FIG. 5), method 400 (FIG. 6) and/or process 500 (FIG. 7) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 11:
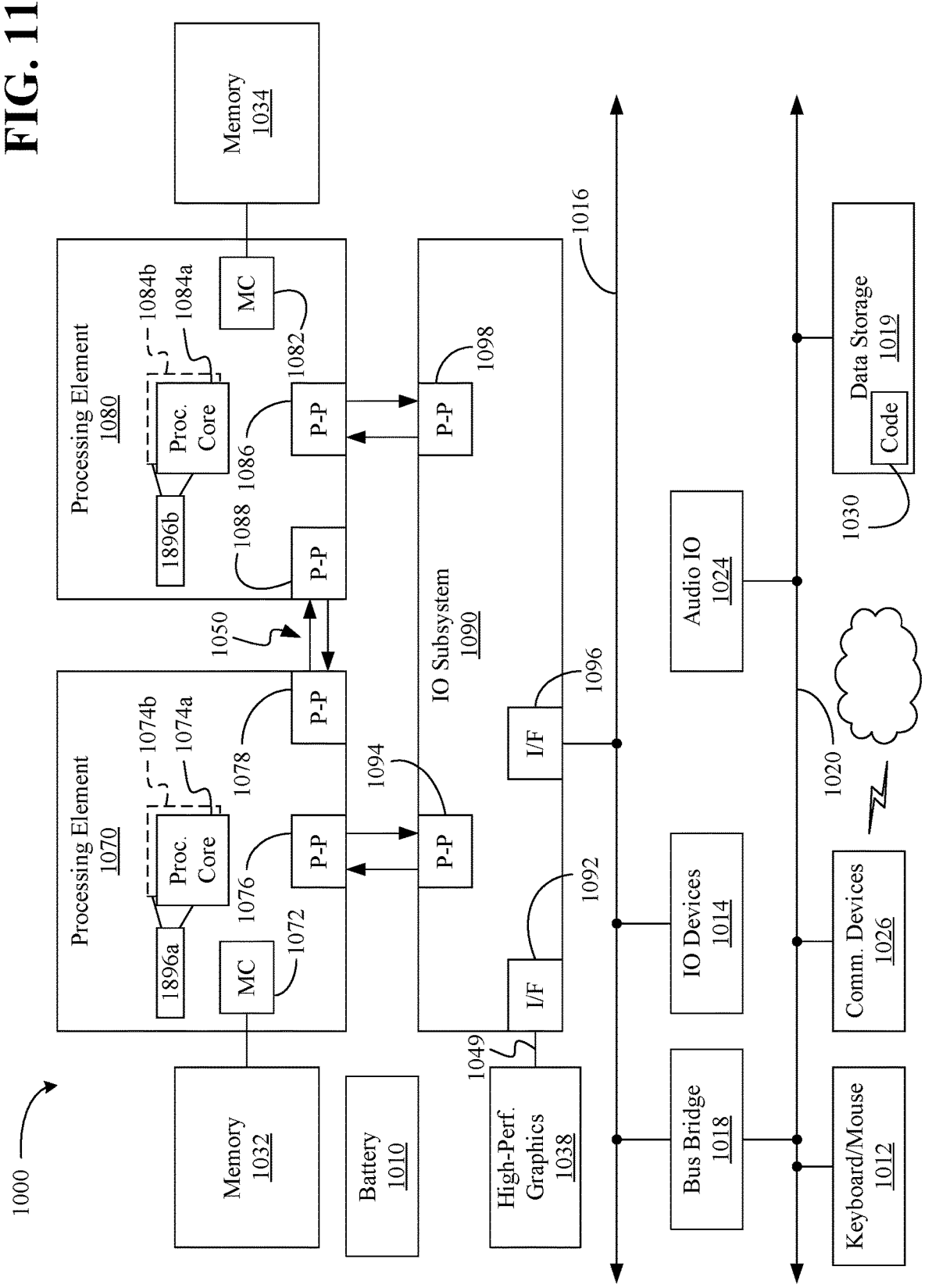
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 10.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC' s 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, system 100 (FIG. 1), the process 350 (FIG. 2), method 800 (FIG. 3) and/or method 300 (FIG. 4), method 380 (FIG. 5), method 400 (FIG. 6) and/or process 500 (FIG. 7) already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples

Example 1 includes a computing system comprising a network controller to communicate with one or more nodes, wherein the one or more nodes include hardware devices, a processor coupled to the network controller, and a memory coupled to the processor, the memory including a set of executable program instructions, which when executed by the processor, cause the processor to generate a signature based on one or more characteristics of an artificial intelligence (AI) model, wherein the AI model is to be in a high-level code, generate a compiled blob based on the AI model, and embed an identifier based on the signature into a metadata field of the compiled blob.

Example 2 includes the computing system of Example 1, wherein the one or more characteristics are to include one or more of layer types of the AI model, attribute names of the AI model, values of the AI model or weights of the AI model.

Example 3 includes the computing system of Example 2, wherein the instructions, when executed, cause the computing system to concatenate the layer types, the attribute names, the values and the weights to generate a concatenated string, and generate the identifier based on the concatenated string.

Example 4 includes the computing system of Example 3, wherein the instructions, when executed, cause the computing system to determine that one or more weights of an operator of the AI model are to be bypassed, and concatenate a first weight associated with the operator and a last weight associated with the operator to generate the concatenated string.

Example 5 includes the computing system of Example 1, wherein the instructions, when executed, cause the computing system to retrieve, with the one or more nodes, the compiled blob, conduct, with the one or more nodes, a verification of the identifier embedded in the compiled blob, and determine, with the one or more nodes, whether to execute the compiled blob based on the verification.

Example 6 includes the computing system of any one of Examples 1 to 5, wherein the instructions, when executed, cause the computing system to hash the signature to generate a hashed signature, and set the hashed signature as the identifier.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to generate a signature based on one or more characteristics of an artificial intelligence (AI) model, wherein the AI model is to be in a high-level code, generate a compiled blob based on the AI model, and embed an identifier based on the signature into a metadata field of the compiled blob.

Example 8 includes the apparatus of Example 7, wherein the one or more characteristics are to include one or more of layer types of the AI model, attribute names of the AI model, values of the AI model or weights of the AI model.

Example 9 includes the apparatus of Example 8, wherein the logic coupled to the one or more substrates is to concatenate the layer types, the attribute names, the values and the weights to generate a concatenated string, and generate the identifier based on the concatenated string.

Example 10 includes the apparatus of Example 9, wherein the logic coupled to the one or more substrates is to determine that one or more weights of an operator of the AI model are to be bypassed, and concatenate a first weight associated with the operator and a last weight associated with the operator to generate the concatenated string.

Example 11 includes the apparatus of Example 7, wherein the logic coupled to the one or more substrates is to retrieve the compiled blob, conduct a verification of the identifier embedded in the compiled blob, and determine whether to execute the compiled blob based on the verification.

Example 12 includes the apparatus of any one of Examples 7 to 11, wherein the logic coupled to the one or more substrates is to hash the signature to generate a hashed signature, and set the hashed signature as the identifier.

Example 13 includes the apparatus of any one of Examples 7 to 11, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to generate a signature based on one or more characteristics of an artificial intelligence (AI) model, wherein the AI model is to be in a high-level code, generate a compiled blob based on the AI model, and embed an identifier based on the signature into a metadata field of the compiled blob.

Example 15 includes the at least one computer readable storage medium of Example 14, wherein the one or more characteristics are to include one or more of layer types of the AI model, attribute names of the AI model, values of the AI model or weights of the AI model.

Example 16 includes the at least one computer readable storage medium of Example 15, wherein the instructions, when executed, further cause the computing system to concatenate the layer types, the attribute names, the values and the weights to generate a concatenated string, and generate the identifier based on the concatenated string.

Example 17 includes the at least one computer readable storage medium of Example 16, wherein the instructions, when executed, further cause the computing system to determine that one or more weights of an operator of the AI model are to be bypassed, and concatenate a first weight associated with the operator and a last weight associated with the operator to generate the concatenated string.

Example 18 includes the at least one computer readable storage medium of Example 14, wherein the instructions, when executed, further cause the computing system to retrieve the compiled blob, conduct a verification of the identifier embedded in the compiled blob, and determine whether to execute the compiled blob based on the verification.

Example 19 includes the at least one computer readable storage medium of any one of Examples 14 to 18, wherein the instructions, when executed, further cause the computing system to hash the signature to generate a hashed signature, and set the hashed signature as the identifier.

Example 20 includes a method comprising generating a signature based on one or more characteristics of an artificial intelligence (AI) model, wherein the AI model is in a high-level code, generating a compiled blob based on the AI model, and embedding an identifier based on the signature into a metadata field of the compiled blob.

Example 21 includes the method of Example 20, wherein the one or more characteristics includes one or more of layer types of the AI model, attribute names of the AI model, values of the AI model or weights of the AI model.

Example 22 includes the method of Example 21, further comprising concatenating the layer types, the attribute names, the values and the weights to generate a concatenated string, and generating the identifier based on the concatenated string.

Example 23 includes the method of Example 22, further comprising determining that one or more weights of an operator of the AI model are to be bypassed, and concatenating a first weight associated with the operator and a last weight associated with the operator to generate the concatenated string.

Example 24 includes the method of Example 20, further comprising retrieving the compiled blob, conducting a verification of the identifier embedded in the compiled blob, and determining whether to execute the compiled blob based on the verification.

Example 25 includes the method of any one of Examples 20 to 24, further comprising hashing the signature to generate a hashed signature, and setting the hashed signature as the identifier.

Example 26 includes a semiconductor apparatus comprising means for generating a signature based on one or more characteristics of an artificial intelligence (AI) model, wherein the AI model is to be in a high-level code, means for generating a compiled blob based on the AI model, and means for embedding an identifier based on the signature into a metadata field of the compiled blob.

Example 27 includes the semiconductor apparatus of Example 26, wherein the one or more characteristics are to include one or more of layer types of the AI model, attribute names of the AI model, values of the AI model or weights of the AI model.

Example 28 includes the semiconductor apparatus of Example 27, further comprising means for concatenating the layer types, the attribute names, the values and the weights to generate a concatenated string, and means for generating the identifier based on the concatenated string.

Example 29 includes the semiconductor apparatus of Example 28, further comprising means for determining that one or more weights of an operator of the AI model are to be bypassed, and means for concatenating a first weight associated with the operator and a last weight associated with the operator to generate the concatenated string.

Example 30 includes the semiconductor apparatus of Example 26, further comprising means for retrieving the compiled blob, means for conducting a verification of the identifier embedded in the compiled blob, and means for determining whether to execute the compiled blob based on the verification.

Example 31 includes the semiconductor apparatus of any one of Examples 26 to 30, further comprising means for hashing the signature to generate a hashed signature, and means for setting the hashed signature as the identifier.

Thus, technology described herein may provide for an enhanced AI blob execution that may securely and efficiently be executed with low latency. Furthermore, the technology may be readily implemented across heterogenous devices to enhance execution of AI blobs and bypass redundant compilations of AI models.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller to communicate with one or more nodes, wherein the one or more nodes include hardware devices;
a processor coupled to the network controller; and
a memory coupled to the processor, the memory including a set of executable program instructions, which when executed by the processor, cause the computing system to:
generate a signature based on one or more characteristics of an artificial intelligence (AI) model, wherein the AI model is to be in a high-level code, wherein the signature is a concatenated string that is generated by a concatenation of a first weight associated with an operator of the AI model and a last weight associated with the operator;
generate a compiled blob based on the AI model;
generate an identifier based on the concatenated string; and
embed the identifier into a metadata field of the compiled blob.

2. The computing system of claim 1, wherein the one or more characteristics are to include a layer type of the AI model, an attribute name of the AI model, a value of the AI model and the first and last weights of the AI model.

3. The computing system of claim 2, wherein the layer type includes layer types, the attribute name includes attribute names, and the value includes values,
wherein the instructions, when executed, cause the computing system to concatenate the layer types, the attribute names, the values and the first and last weights to generate the concatenated string.

4. The computing system of claim 3, wherein the instructions, when executed, cause the computing system to:
determine that one or more weights of the operator of the AI model are to be bypassed for the concatenated string.

5. The computing system of claim 1, wherein the instructions, when executed, cause the computing system to:
retrieve, with the one or more nodes, the compiled blob;
conduct, with the one or more nodes, a verification of the identifier embedded in the compiled blob; and
determine, with the one or more nodes, whether to execute the compiled blob based on the verification.

6. The computing system of claim 1, wherein the instructions, when executed, cause the computing system to:
hash the signature to generate a hashed signature; and
set the hashed signature as the identifier.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
generate a signature based on one or more characteristics of an artificial intelligence (AI) model, wherein the AI model is to be in a high-level code, wherein the signature is a concatenated string that is generated by a concatenation of a first weight associated with an operator of the AI model and a last weight associated with the operator;
generate a compiled blob based on the AI model;
generate an identifier based on the concatenated string; and
embed the identifier into a metadata field of the compiled blob.

8. The apparatus of claim 7, wherein the one or more characteristics are to include a layer type of the AI model, an attribute name of the AI model, a value of the AI model and the first and last weights the AI model.

9. The apparatus of claim 8, wherein the layer type includes layer types, the attribute name includes attribute names, and the value includes values,
wherein the logic coupled to the one or more substrates is to concatenate the layer types, the attribute names, the values and the first and last weights to generate the concatenated string.

10. The apparatus of claim 9, wherein the logic coupled to the one or more substrates is to:
determine that one or more weights of the operator of the AI model are to be bypassed for the concatenated string.

11. The apparatus of claim 7, wherein the logic coupled to the one or more substrates is to:
retrieve the compiled blob;
conduct a verification of the identifier embedded in the compiled blob; and
determine whether to execute the compiled blob based on the verification.

12. The apparatus of claim 7, wherein the logic coupled to the one or more substrates is to:
hash the signature to generate a hashed signature; and set the
hashed signature as the identifier.

13. The apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
generate a signature based on one or more characteristics of an artificial intelligence (AI) model, wherein the AI model is to be in a high-level code, wherein the signature is a concatenated string that is generated by a concatenation of a first weight associated with an operator of the AI model and a last weight associated with the operator;
generate a compiled blob based on the AI model;
generate an identifier based on the concatenated string; and
embed the identifier into a metadata field of the compiled blob.

15. The at least one non-transitory computer readable storage medium of claim 14, wherein the one or more characteristics are to include a layer type of the AI model, an attribute name of the AI model, a value of the AI model and the first and last weights of the AI model.

16. The at least one non-transitory computer readable storage medium of claim 15, wherein the layer type includes layer types, the attribute name includes attribute names, and the value includes values,
wherein the instructions, when executed, further cause the computing system to concatenate the layer types, the attribute names, the values and the first and last weights to generate the concatenated string.

17. The at least one non-transitory computer readable storage medium of claim 16, wherein the instructions, when executed, further cause the computing system to:
determine that one or more weights of the operator of the AI model are to be bypassed for the concatenated string.

18. The at least one non-transitory computer readable storage medium of claim 14, wherein the instructions, when executed, further cause the computing system to:
retrieve the compiled blob;
conduct a verification of the identifier embedded in the compiled blob; and
determine whether to execute the compiled blob based on the verification.

19. The at least one non-transitory computer readable storage medium of claim 14, wherein the instructions, when executed, further cause the computing system to:
hash the signature to generate a hashed signature; and
set the hashed signature as the identifier.

20. A method comprising:
generating a signature based on one or more characteristics of an artificial intelligence (AI) model, wherein the AI model is in a high-level code, wherein the signature is a concatenated string that is generated by a concatenation of a first weight associated with an operator of the AI model and a last weight associated with the operator;
generating a compiled blob based on the AI model;
generating an identifier based on the concatenated string; and
embedding the identifier into a metadata field of the compiled blob.

21. The method of claim 20, wherein the one or more characteristics includes a layer type of the AI model, an attribute name of the AI model, a value of the AI model and the first and last weights of the AI model.

22. The method of claim 21, wherein the layer type includes layer types, the attribute name includes attribute names, and the value includes values,
the method further comprises concatenating the layer types, the attribute names, the values and the first and last weights to generate the concatenated string.

23. The method of claim 22, further comprising:
determining that one or more weights of the operator of the AI model are to be bypassed for the concatenated string.

24. The method of claim 20, further comprising:
retrieving the compiled blob;
conducting a verification of the identifier embedded in the compiled blob; and determining
whether to execute the compiled blob based on the verification.

25. The method of claim 20, further comprising:
hashing the signature to generate a hashed signature; and
setting the hashed signature as the identifier.

\* \* \* \* \*